No. 775,827. PATENTED NOV. 22, 1904.
A. J. KETELSEN.
STEAM COOKER AND PRESSER.
APPLICATION FILED JULY 29, 1903.
NO MODEL.
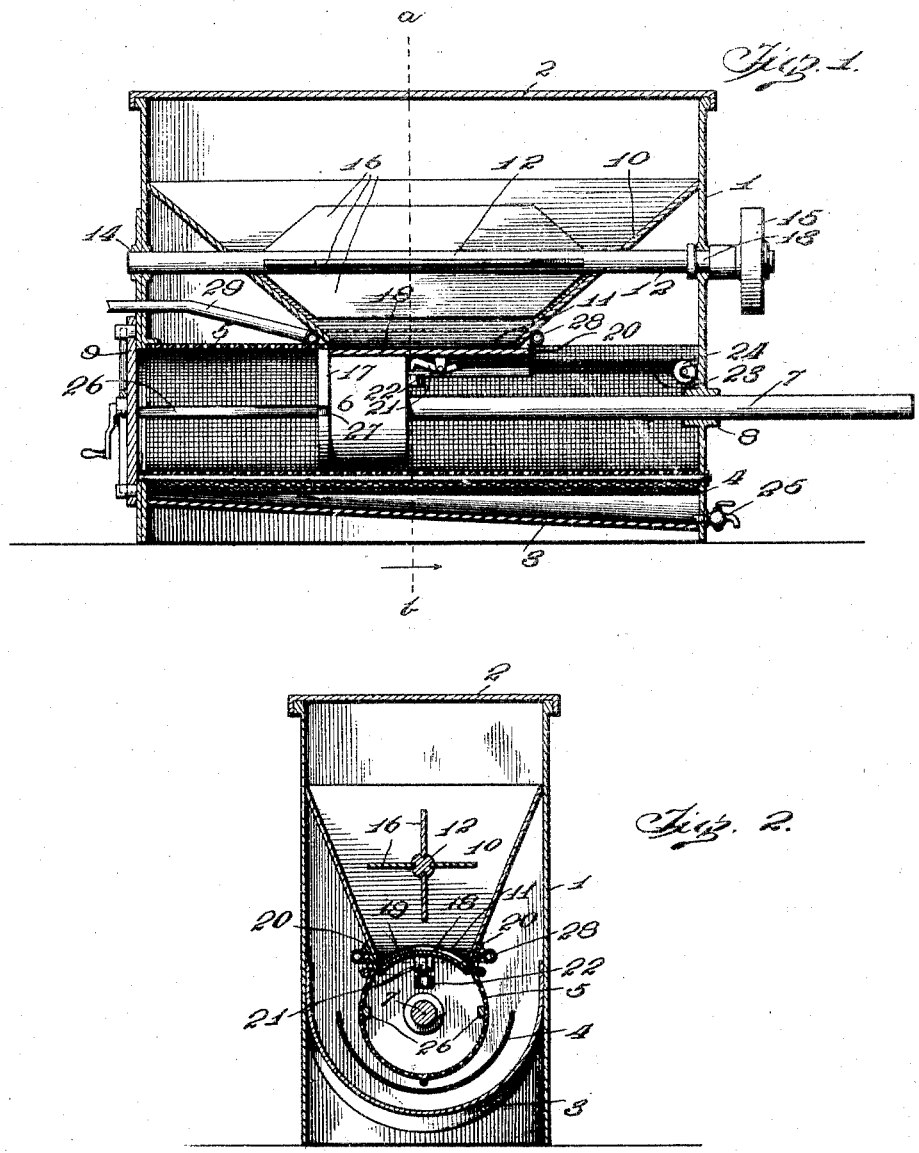

No. 775,827. Patented November 22, 1904.

UNITED STATES PATENT OFFICE.

ANDREW J. KETELSEN, OF SEATTLE, WASHINGTON.

STEAM COOKER AND PRESSER.

SPECIFICATION forming part of Letters Patent No. 775,827, dated November 22, 1904.

Application filed July 29, 1903. Serial No. 167,476. (No model.)

*To all whom it may concern:*

Be it known that I, ANDREW J. KETELSEN, a citizen of the United States, residing at Seattle, in the county of King and State of Washington, have invented certain new and useful Improvements in Steam Cookers and Pressers; and I do hereby declare the following to be a full, clear, and exact description of the invention, such as will enable others skilled in the art to which it appertains to make and use the same.

This invention relates to improvements in presses, and particularly to that class of presses in which any kind of vegetable or animal matter may be inclosed and subjected to the cooking action of heat or steam and subjected to pressure for extracting the liquids therefrom while the material is kept softened through the action of the heat or steam.

The invention consists in a press provided with a perforated press-casing, a plunger moving therein, and means for introducing heat or steam for softening the material to be pressed.

It also consists in a cooking and pressing mechanism comprising a cylindrical perforated receptacle, a plunger mounted so as to reciprocate therein, means for feeding material into said cylindrical receptacle, and means for heating the interior of the mechanism.

It also consists in certain other novel constructions, combinations, and arrangements of parts, as will be hereinafter fully described and claimed.

In the accompanying drawings, Figure 1 is a vertical longitudinal central section through a press embodying the features of this invention. Fig. 2 is a transverse vertical section taken upon the line *a b* of Fig. 1.

This invention contemplates a pressing means and a feeding and stirring mechanism for receiving and handling all kinds of vegetable and animal matters, the liquids of said materials being expressed, while the solid materials are discharged in a dry form for various uses.

The invention is especially useful in the handling of fish offal and is found especially helpful in taking care of the refuse at fish-canneries and the like, making it possible to utilize materials which have heretofore generally been thrown away. In this manner fish-oil is obtained from these materials, and the dry portions may be utilized for fertilizing purposes.

In the accompanying drawings is illustrated my improved form of press and cooker, in which an inclosing casing 1 is employed, provided with a suitable cover 2 for entirely inclosing the apparatus within. The casing 1 is formed with a curved bottom 3, which is preferably inclined from one end of the casing to the other, as shown in Fig. 1. A semicircular screen of comparatively fine mesh, as 4, is mounted in the casing 1 a short distance above the collecting-floor 3 at the bottom. Above the screen 4 is arranged a tubular cylindrical casing 5, which is preferably constructed of material sufficiently strong to form a portion of the press, the said material being perforated, as shown, in order to permit of the extraction of the liquids from the material pressed. The tubular screen 5 thus formed surrounds a plunger or piston head 6, which reciprocates therein, the said piston-head being carried by a piston-rod 7, which projects from one end of the tubular screen through a bearing 8, formed in the casing 1. The end of the tubular screen 5 adjacent to the bearing 8 is closed by the wall of the casing 1, as shown in Fig. 1, while at the other end an opening is made in the casing 1 of the same diameter as that of the screen-tube 5. This opening is normally closed by a head or door 9, which may be fastened into place by bolts or other fastenings, as desired, the said fastenings being capable of removal for opening the end of the tubular screen when desired. Above the screen press-tube 5 a hopper 10 is arranged within the casing 1, the said hopper having sides projecting toward an outlet-opening 11 at the bottom. The mouth or outlet of the hopper is arranged above the central portion of the press-tube 5, as clearly shown in the drawings. The upper portion of the screen press-tube 5 is cut away beneath the mouth of the hopper and also from said hopper to the end wall of the casing 1, which carries the bearing 8. The hopper 11 is made of a suitable depth to receive a quantity of materials to be operated upon, and a stirring mechanism is mounted within the hopper for agitating materials placed therein, comprising a shaft 12, which extends longitudinally through the hopper, passing out through the end walls of the hopper and finding bearings, as at 13 and 14, in the end walls of the casing 1. One end of the shaft 12 extends beyond the bearing 13 a sufficient distance to receive a pulley 15, by which the shaft may be rotated. The shaft 12 carries at its central portion and within the hopper 10 a series of fans or paddles 16, which extend nearly the full length of the hopper, so as to be capable of thoroughly agitating all of the material placed therein. A revolution of the shaft 12 by means of its pulley 15 will cause a movement of the fans or paddles 16 within the hopper when it is desired to stir the material therein.

The piston 6 is provided with an annular flange 17 adjacent to its pressing-face, which flange 17 is thus in position to engage a slide or cover 18, arranged beneath the hopper 10 and adapted to close its mouth or outlet 11. The cover or slide 18 is formed of a curved body portion 19, having upwardly-bent side wings or flanges 20, which fit against the inclined sides of the hopper 10 and assist in guiding the slide in its movement. When the piston 6 is retracted—that is to say, is drawn toward the bearing 8, so that material may be deposited in front of it from the hopper 10—the slide 18 is engaged by the flange 17 of the piston and moves from beneath the mouth of the hopper, so as to permit a discharge of materials therefrom. The slide is drawn beneath the mouth of the hopper again when the piston is moved forward to perform the pressing operation by means of a catch 21, which is pivoted to the under side of the slide 18. The catch normally drops into engagement with a detent 22, carried by the piston 6, so that when the piston is forced forwardly in the press-tube 5 the slide 18 will be carried with it. One end of the catch 22, however, is connected with a steel tape or wire 23, which is fastened to the spring-actuated winding drum or pulley 24, mounted in the end of the casing 1 adjacent to the bearing 8. The tension of the spring pulley or drum 24 is just sufficient to take up any slack in the tape 23, but not sufficient to disengage the latch from the detent. When, however, the slide 18 has been moved to its position beneath the mouth of the hopper 10, the tape 23 will have been pulled from the pulley or drum 24 its entire length, so that the catch 21 will then be raised and disengaged from the detent 22 by the pull of the tape 23. In this manner the slide will be released from the piston 6, and as the piston travels toward the door or cover 9 it will leave the slide 18 over the mouth of the hopper and prevent any material dropping from the hopper behind the said piston. When the piston is retracted again, so that the flange 17 engages the edge of the slide 18 and begins to move it, the strain upon the tape 23 will be slackened, and the catch 21 will be permitted to drop into engagement with the detent 22 again, ready to draw the slide forwardly upon the next reciprocation of the piston.

The piston is moved by any suitable pressure applied to the piston-rod 7 and when forced toward the door 9 will press materials in the press-tube 5 against the door 9, extracting oil or other liquids from the material placed in the press-tube and permitting it to drain through upon the screen 4 and therefrom to the collecting-floor 3. The liquids may be removed from the collecting-floor 3 through a draw-off cock 25 at suitable intervals. The movement of the piston 6 is facilitated by guide bars or rods 26, arranged within the screen press-tube 5 and engaging notches or recesses 27, formed in the opposite sides of the flange 17. These rods so guide the movement of the piston that great friction is obviated and the movement of the piston is rendered free and smooth. These guides also prevent the piston from wearing upon the press-tube to any great extent.

In handling many kinds of material it is best and sometimes necessary to heat or cook the contents of the hopper 10 and the press-tube 5. I preferably employ steam for this purpose, introducing the same through the pipe 28, which is arranged to extend around the walls of the hopper 10, preferably just above the delivery-mouth thereof. This ring of piping 28 is perforated to permit of the escape of steam in all directions within the casing, the said ring 28 being supplied with steam through an inlet-pipe 29.

In operation the material to be treated is placed in the hopper 10, after which the cover 2 of the casing is put in position. The mouth of the hopper is kept closed a suitable length of time by means of the slide 18, while the agitator is rotated by means of the shaft 12 to thoroughly stir the material in the hopper. Steam is turned on at the same time, so as to thoroughly cook and soften the material in the hopper. After the material has been treated in this manner a suitable length of time the plunger 6 is retracted so as to move the slide 18 from beneath the mouth of the hopper and the material is discharged into the press-tube 5. The plunger is then forced against said material, the slide 18 being brought forwardly at the same time to prevent material dropping behind the plunger. The action of the steam preserves the materials in a heated condition while being pressed, and this is especially useful when fish offal is being treated, as the glue present in such materials will quickly harden if it becomes cool and would prevent the proper operation of the mechanism. The oils or other materials pressed from the material in the press-tube drop upon the screen 4 from the perforated press-tube and passing through the same are collected upon the collecting-bottom 3. Any particles of solid material which may escape through the apertures of the screen press-tube will be caught by the finer mesh of the screen 4. The liquids may, as above stated, be removed through the draw-off cock 25 whenever it is desirable or necessary. When the solid material in the press-tube has been sufficiently pressed, the slide or door 9 is removed, and the plunger or piston 6 is moved forward to force the same out of the end of the casing. Such dry material may then be used for fertilizing purposes. The entire contents of the casing 1 is kept properly heated by the steam during the entire operation, so that ingredients which may have a tendency to congeal when cool will not be permitted to congeal and are prevented from clogging the operation of the mechanism.

It will be evident that the details of construction may be modified within the spirit of the invention, for any suitable means may be employed, for instance, in controlling the exit of material from the hopper 10, and any suitable agitating mechanism may be used within the hopper as may be found most desirable.

Having thus fully described my invention, what I claim as new, and desire to secure by Letters Patent, is—

1. A press mechanism comprising a feeding-hopper, an elongated tubular screen provided with an opening in one side, means for feeding material through said opening, a plunger reciprocating within the screen, a loose cover for closing the inlet-opening when the plunger is pressing material in the tube, upwardly-projecting guide-flanges thereon partially embracing said hopper, and means for connecting the cover with the plunger at the proper time for closing the inlet-opening.

2. A pressing mechanism comprising a casing, a perforated receptacle mounted therein having an inlet-opening in one side, a cover for closing said opening, a plunger moving in said perforated receptacle, means for connecting the cover with the plunger or disconnecting it therefrom for actuating the cover in correspondence with the movement of the plunger, and means for releasing said connecting means when the cover has reached a predetermined position.

3. A press comprising a perforated casing, a plunger reciprocating therein, the said casing being provided with a lateral opening at a suitable distance from the pressing end of the casing, means for closing the said opening comprising a slide, means carried by the slide for engaging the plunger, and means for disconnecting the slide from the plunger during the pressing operation.

4. A press mechanism comprising a perforated press-receptacle, a plunger reciprocating therein, the press-receptacle having an inlet-opening through one side thereof, a slide for covering the opening when the pressing operation is being accomplished, a flange upon the plunger for pushing the slide away from the opening, a latch for engaging the plunger and pulling the slide over the opening again, and means for disconnecting the latch when the plunger passes into the pressing end of the receptacle.

5. A press mechanism comprising a casing, a tubular screen mounted therein, a piston moving in the screen, a feed-hopper arranged to discharge material into the tubular screen through the side thereof, means for controlling the discharge of material into the tubular screen comprising a slide having a curved body portion and guiding edge flanges, a latch carried by the slide and engaging the piston, a spring-actuated tape for controlling the action of the latch and a flange upon the piston for moving the slide in one direction.

6. A pressing mechanism comprising a casing, a perforated press-tube mounted therein, said press-tube being perforated substantially throughout its length, a feed-hopper mounted above the press-tube for delivering materials thereto, an agitator in said hopper, and means for delivering steam or other heating agent into the casing below said agitator so as to surround the hopper and the press-tube for cooking and heating the substance to be pressed.

7. A press mechanism comprising a casing, an elongated perforated cylinder mounted therein having an inlet-opening at about the central portion of said tube, a plunger reciprocating in the tube, a cover for closing the inlet-opening provided with guide-flanges, a feed-hopper extending partially into the mouth of the opening and engaging the flanges of the cover for guiding it in its movement, and means for intermittently connecting the plunger with the cover for operating it.

8. A press mechanism comprising an inclosure, a tubular press-screen mounted within the same, a hopper above the press-screen, and discharging through the opening in the upper side of the said screen, a sliding cover for closing the said opening, a piston moving in the press-screen formed with an annular flange at one end arranged to engage the end of the cover and means for connecting the cover with the piston together with means for automatically releasing it therefrom.

9. A press mechanism comprising a closure, an elongated perforated press-screen mounted therein, a piston moving in said press-screen, the press-screen having an opening formed in its upper side, a hopper for discharging material into said opening, a slide for controlling the discharge of such material, a latch carried by the slide and adapted to engage a keeper mounted on the piston, a tape connected with one end of the latch, a spring-actuated drum for winding in the tape, the latch being operated when the tape is pulled to its full length to release it from the plunger and means for returning the slide in an opposite direction to that in which it is moved by the latch.

In testimony whereof I hereunto affix my signature in presence of two witnesses.

ANDREW J. KETELSEN.

Witnesses:
G. WARD KEMP,
L. C. MASSIE.